(12) United States Patent
Raux et al.

(10) Patent No.: US 10,133,920 B2
(45) Date of Patent: Nov. 20, 2018

(54) OCR THROUGH VOICE RECOGNITION

(71) Applicant: Lenovo (Singapore) Pte. Ltd., Singapore (SG)

(72) Inventors: Antoine Roland Raux, Cupertino, CA (US); Grigori Zaitsev, Durham, NC (US); Russell Speight VanBlon, Raleigh, NC (US); Jianbang Zhang, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 321 days.

(21) Appl. No.: 14/633,875

(22) Filed: Feb. 27, 2015

(65) Prior Publication Data

US 2016/0253992 A1 Sep. 1, 2016

(51) Int. Cl.
| | | |
|---|---|---|
| *G10L 15/00* | (2013.01) | |
| *G06K 9/00* | (2006.01) | |
| *G10L 15/32* | (2013.01) | |
| *G10L 25/48* | (2013.01) | |
| *G10L 17/20* | (2013.01) | |
| *G10L 15/22* | (2006.01) | |
| *G06K 9/68* | (2006.01) | |

(52) U.S. Cl.
CPC ......... *G06K 9/00402* (2013.01); *G10L 15/32* (2013.01); *G10L 25/48* (2013.01); *G06K 2009/6871* (2013.01); *G10L 2015/226* (2013.01)

(58) Field of Classification Search
CPC ..... G06K 9/00402; G10L 25/48; G10L 15/32; G10L 2015/226
USPC .......................................... 704/240
See application file for complete search history.

(56) References Cited

U.S. PATENT DOCUMENTS

2011/0004462 A1* 1/2011 Houghton ............. G10L 15/183
704/9

FOREIGN PATENT DOCUMENTS

JP 04329598 A * 11/1992 ............... G06K 9/00

* cited by examiner

*Primary Examiner* — Thierry L Pham
(74) *Attorney, Agent, or Firm* — Ference & Associates LLC (57) ABSTRACT

One embodiment provides a method, including: receiving, at an input and display device, handwriting input; receiving, using a processor, voice input; generating, using a processor, at least one first word based on the handwriting input; generating, using a processor, at least one second word based on the voice input; and determining, using a processor, a highest probability word based on the at least one first word and the at least one second word. Other aspects are described and claimed.

20 Claims, 4 Drawing Sheets

OCR THROUGH VOICE RECOGNITION

BACKGROUND

Information handling devices ("devices"), for example cell phones, smart phones, tablet devices, laptop computers, and the like permit users to input handwriting using a finger or pen/stylus. This allows users to write more naturally and without the use of a keyboard.

Conventionally a handwriting field, box or pane is presented to the user as an overlay (e.g., a rectangle in a lower portion of a touch screen display). In this area the user may provide input handwriting strokes (e.g., letters, numbers, characters, symbols, etc.). The device employs software that uses the input handwriting strokes, which are generally presented on screen to provide visual feedback to the user, as input by converting the handwriting stroke input locations on the touch screen into machine text according to the language setting of the device. Alternatively, a graphic or image of unconverted handwriting input may be placed into an underlying application, e.g., an image of the user's signature.

While various methods are employed, logic is applied to detect the particular handwriting input (e.g., detecting that the handwriting strokes form a letter, a number, a character, a symbol, etc.). These methods are collectively referred to herein as handwriting recognition. As part of the process of recognizing handwriting input strokes as machine input (e.g., a letter, a number, a character, a symbol, etc.) candidate machine inputs are produced. For example, handwriting input strokes of a cursive letter "v" may be scored as 90 percent likely machine input "v" and 50 percent likely machine input "u." As this process progresses for consecutive characters, candidate letters and words may be generated based on the processed handwriting inputs. The candidate words are scored to select an input word, referred to herein as a machine input word. The machine input word selected is provided to an underlying application and presented as typeset in the display, with the machine input word itself being used as the basis for offering a spell checking function.

BRIEF SUMMARY

In summary, one aspect provides a method, comprising: receiving, at an input and display device, handwriting input; receiving, using a processor, voice input; generating, using a processor, at least one first word based on the handwriting input; generating, using a processor, at least one second word based on the voice input; and determining, using a processor, a highest probability word based on the at least one first word and the at least one second word.

Another aspect provides an information handling device, comprising: an input device; a display device; an audio capture device; a processor; a memory device that stores instructions executable by the processor to: receive handwriting input; receive voice input; generate at least one first word based on the handwriting input; generate at least one second word based on the voice input; and determine a highest probability word based on the at least one first word and the at least one second word.

A further aspect provides product, comprising: a storage device having code stored therewith, the code being executable by a processor and comprising: code that receives, at an input and display device, handwriting input; code that receives voice input; code that generates at least one first word based on the handwriting input; code that generates at least one second word based on the voice input; and code that determines a highest probability word based on the at least one first word and the at least one second word.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When writing with a pen/stylus or finger, handwriting input can be transformed or converted into machine input (e.g., via a handwriting recognition processing). Here a note of caution is in order, as the term machine input word may not be a proper word, e.g., it may be an incorrectly spelled word, a slang word, an acronym, etc. Thus, machine input word is used to refer to the string of machine typeset characters generated by processing the handwriting input.

In order to convert handwriting input into machine input word, software applications must analyze the handwriting and attempt to determine what characters (e.g., American Standard Code for Information Interchange (ASCII), etc.) the handwriting is intended to represent. Typically this is done through optical character recognition (OCR), however OCR doesn't account for formatting and proper segmentation of sections, thus other tools or programs are usually paired with OCR to increase the reliability.

Optical character recognition is well known in the art and thus will not be expounded upon in great detail. Broadly two separate forms of OCR exist, off-line (i.e., conversion handwriting or image text into letter codes which are useable with computer and text-processing applications) and on-line (i.e., automatic conversion of text as it is written on a digitizer or tablet device, where a sensor picks up pen-tip movements). The following descriptions will focus on the on-line method of character recognition; however, one of ordinary skill in the art would recognize that the methods and practices discussed below are broadly applicable to both forms.

One commonality in most forms of handwriting recognition is that it a difficult task and can be prone to error. The broad range of individual handwriting styles combined with the extensive amount of available languages, not to mention slang, currently present in the general lexicon make it nearly impossible to detect with 100% accuracy all forms of handwriting input.

This technical issue presents problems to a user because it reduces their ability to properly input information or transfer information electronically to others. When a software application is unable to determine with proper accuracy what a user is attempting to input, it causes delays or errors in the input. If the software application has the ability to prompt the user and offer a list of suggested word alternatives to chose from, it may enable the user to reduce errors by selecting the correct word. However this method is still far from a perfect system as it is slow and tedious. A solution is needed that increases the overall accuracy of the character recognition but also doesn't require the user to slow down their pace of information entry (e.g., pausing their handwriting input to select an alternative word from a list). This technical improvement would not only increase the efficiency of the user, but it would enable a very natural form of user input which has until this point remained overly complicated, difficult to use, and has unpredictable results.

Accordingly, an embodiment provides a method of receiving a standard form of user handwriting input, (e.g., from a tablet, smartphone, or similar touch device). In addition to the handwriting input, audio input is captured. This audio input could be, for example, a user speaking aloud the terms they are inputting as they write. Additional embodiments may include: a meeting where people are discussing a specific topic relating to the handwriting input, or a lecture hall where a student is taking notes and recording the professor's lecture. This secondary method of input, allows for analyzing of the audio input using voice recognition systems. Once the terms are recognized, the words are converted into a machine input word or words. Using these additional possible machine input words, combined with the previously available options based on the handwriting input enables the handwriting recognition software to produce better results. The ability of the handwriting recognition software is improved because it has two separate sets of word possibilities to select from, and the combination of the probabilities allows for a higher over all probability of success.

Another embodiment, allows the user to preemptively determine the word being entered based on the voice input. For example, if a user were to say the word "alcohol" or the current conversation had used the term "alcohol" multiple times the software would know that the term alcohol is a likely term to be entered by the user. Thus, as the user begins to handwrite the letters 'a' 'l' 'c' the software application could suggest the term "alcohol", versus for example alchemy, to the user for them to select without requiring the user to input the full word length. Thereby increasing the user's ability to enter words quickly and accurately.

The illustrated example embodiments will be best understood by reference to the figures. The following description is intended only by way of example, and simply illustrates certain example embodiments.

Figure 1:
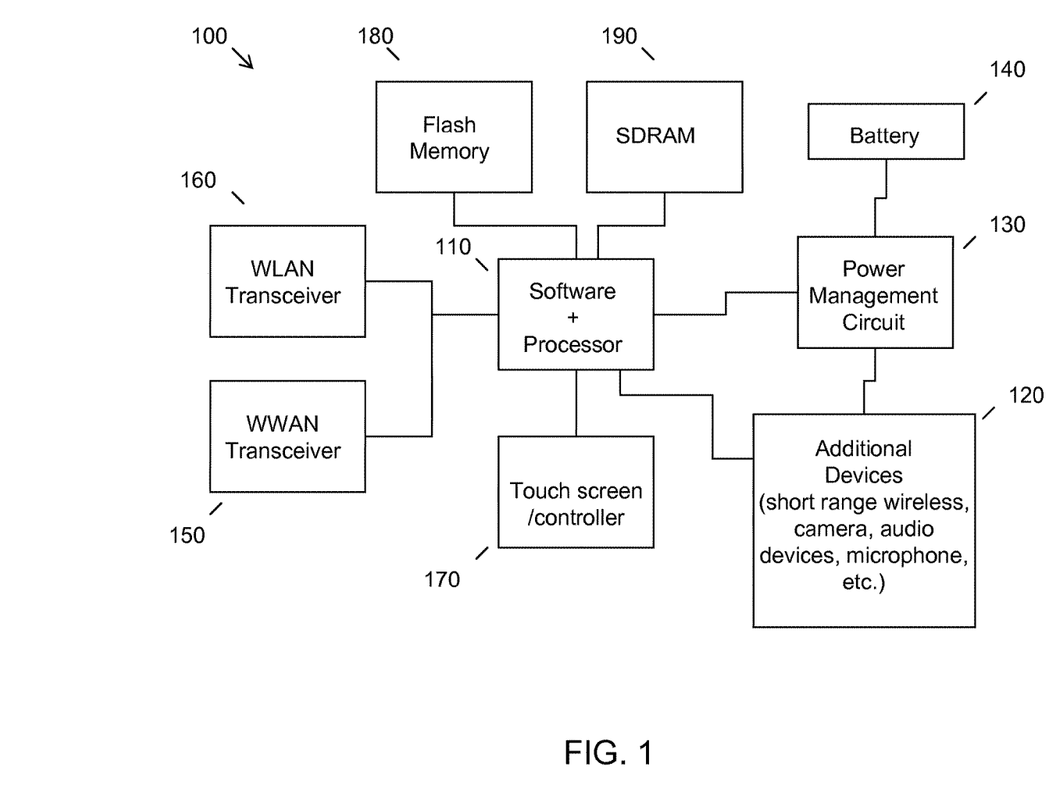
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
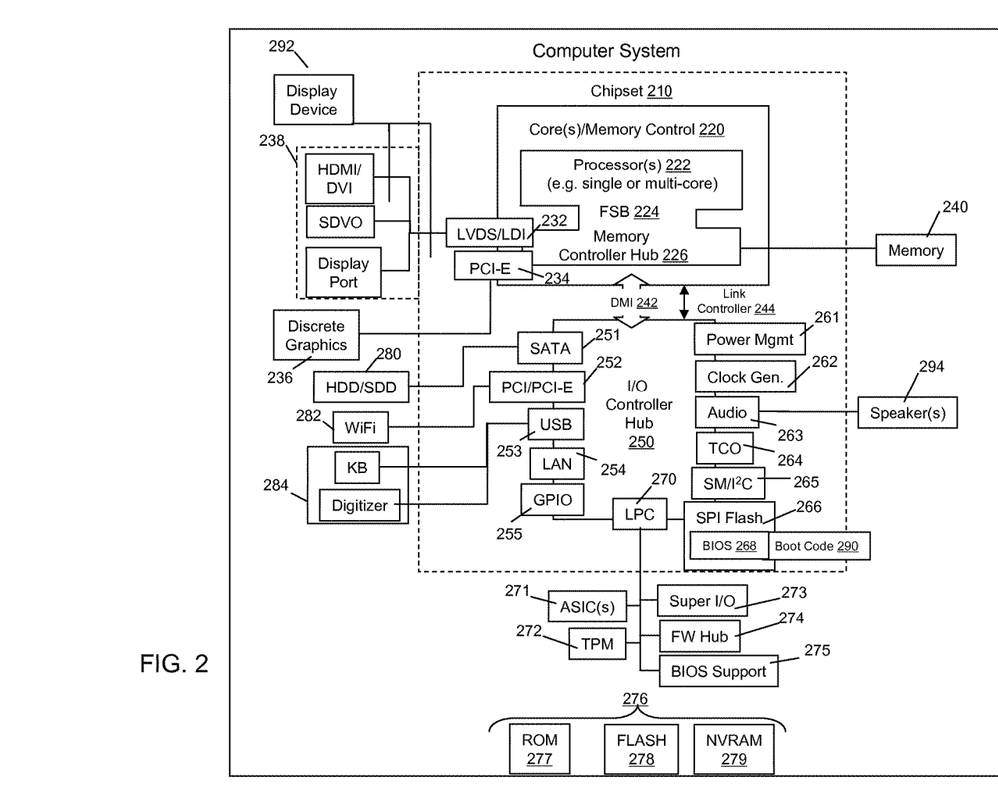
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may employ for various functions (e.g., inputting handwriting input). For example, the circuitry outlined in FIG. 1 may be implemented in a tablet or smart phone embodiment, whereas the circuitry outlined in FIG. 2 may be implemented in a personal computer embodiment. In each case, the device may include an input and display device (e.g., a touch screen or the like), which acts to accept stylus input and provides visual displays of ink strokes input and free hand input as well as components to modify properties of previously entered objects.

Figure 3:
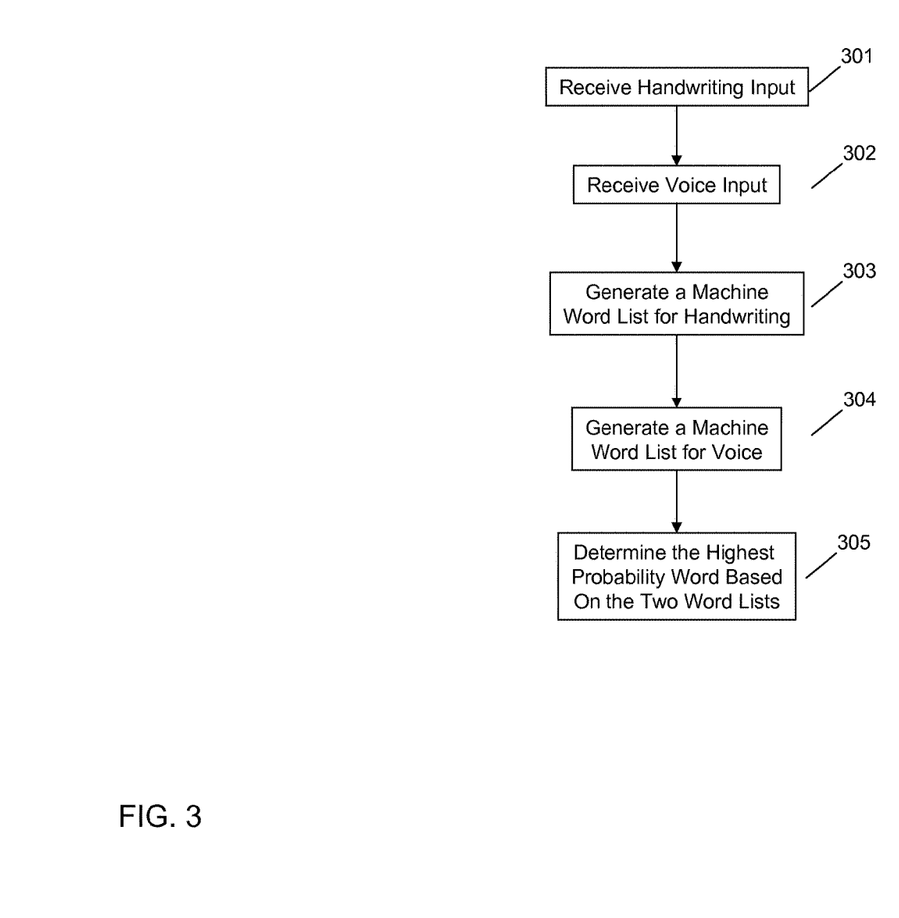
FIG. 3 illustrates an example method of improving handwriting recognition through voice recognition.

Referring now to FIG. 3, an embodiment receives handwriting input 301. The handwriting input is received on a touch sensitive device (e.g., a tablet, smartphone, laptop with touch screen, or any such touch screen device). The input can be any typical method of input such as a finger or stylus (e.g., a capacitive stylus, a resistive stylus, a surface acoustic wave stylus, an active digitizer stylus, etc.). The handwriting input can consist of any available characters, including letters, numbers, symbols, etc.

Additionally, as the handwriting input is being entered 301, an audio capture device (e.g., a microphone on a tablet or PC) captures audio input 302. By way of example, a user can enter handwriting input, while simultaneously speaking a verbal representation of the words they are writing (e.g., writing the word "black" while saying "black" out loud). Using both of these forms of input, a machine input word list is generated for each corresponding type of input. For example, as the user inputs their handwriting input 301, OCR is completed and a machine input word list is generated relating to the handwriting input 303. This list would contain what the recognition algorithm believes are the likely the user is inputting. Additionally, it would contain probability statistics showing which words are more likely, and by what margin (e.g., if the user wrote the word black, the machine input word list could contain the word "block" with a 40% correct selection chance). Having a user declare through verbal representations the words they are currently entering as handwriting input is only one possible embodiment.

In an additional embodiment, the user isn't required speak the exact word being written as voice input 302. For example, a user could be taking notes in a meeting style setting, and the audio input would be the meeting participates engaging in discussion. During a typical meeting, multiple people would be discussing a general topic that the user is likely taking notes on. Because certain words are likely to be repeated during the meeting discussion, the software will have additional machine input word lists to compare the handwriting input against. The application can also make use of context clues, (e.g., if the meeting was discussing alcohol sales in a certain market, the term "market share" could be included on the list of likely machine input words to compare against handwriting input even in it was never spoken directly. In additional embodiments, the user may be in a classroom setting or lecture hall where a professor or instructor is the only person speaking. As the user takes handwritten notes, the audio captured from the instructors can be used to generate an additional machine input word list against which to test the handwriting recognition.

Therefore, any setting involving audio input 302 that relates generally (e.g., a meeting, conversation, etc.) to what a user is inputting 301 may be utilized to increase the recognition software's success rate. Although parts of the verbal discussion or meeting may contain language that is not included in the user's handwritten notes, it still enables the software to narrow the selection choices and improve the accuracy of the hand writing recognition.

Once the handwriting input is received 301 and the voice input is received 302, a software application generates a machine input word list from both 303/304. By way of example, an embodiment, takes the handwriting input and preforms typical handwriting analysis as discussed above to create a possible list of correct machine input words 303. By way of example, if a user wrote the word "alcohol", the OCR recognition program could likely suggest the following recognition candidates for the machine input word list: "apple" with 50% chance; "alcohol" with 40% chance; all other with 10% chance.

Additionally and simultaneously, the voice input 302 is used to generate an additional machine input word list 304. By further way of example, an embodiment analyzes the speech input for key words, phrases, topics, and the like. In a similar manner to above, the analysis is used to create a possible list of correct machine input words 304. For example, a user speaks the word "alcohol" then, and as above, the speech recognition program analyzes the speech and suggests the following candidates for the machine input word list: "alkaline" with 50% chance; "alcohol" with 40% chance; "apple" with 5% chance; all other with 5% chance.

In a further embodiment, once the two machine input word lists are generated 303/304, a determination is carried out to determine the highest probability term and use that term as the recognized representation of the handwriting input 305. Continuing from the previous two examples, if the handwriting input OCR or the voice recognition is used alone, both would return incorrect responses. The handwriting OCR would return "apple", based on a 50% likelihood rate, and the voice recognition would return "alkaline", also based on a 50% likelihood rate. However, when the two probabilities are combined, the resulting list would give the correct recognition result based on the combined machine input word list (e.g., "alcohol" with a 40% chance, "apple" with a 27.5% chance, "alkaline" with a 25% chance, and all other with a 7.5% chance).

Additionally or alternatively, the machine input word list could use a weighting system, in conjunction to the probability system outlined above, to weight the separate machine input word lists individually. By way of example, in an embodiment, if a user has extremely poor handwriting, they would receive a poor handwriting recognition score. Additionally, if the user is speaking the words directly as they input them, and their voice input is clear and easily interpreted, they might have a high voice recognition score. Using these scores, the machine input word lists would not only factor in the probability statistics shown above, but would also more heavily weight the voice recognition input.

Alternatively, if the user is in the aforementioned meeting setting, and the topics of discussion vary greatly, it may be more difficult for the voice recognition software to determine context or create a list of machine input words that appear with regular frequency, thus result in a low voice recognition score. In this embodiment, the system would more heavily weight the user's handwriting input, by use of a higher hand writing recognition score, over the voice recognition results which may not be as relevant to the notes being taken.

Figure 4:
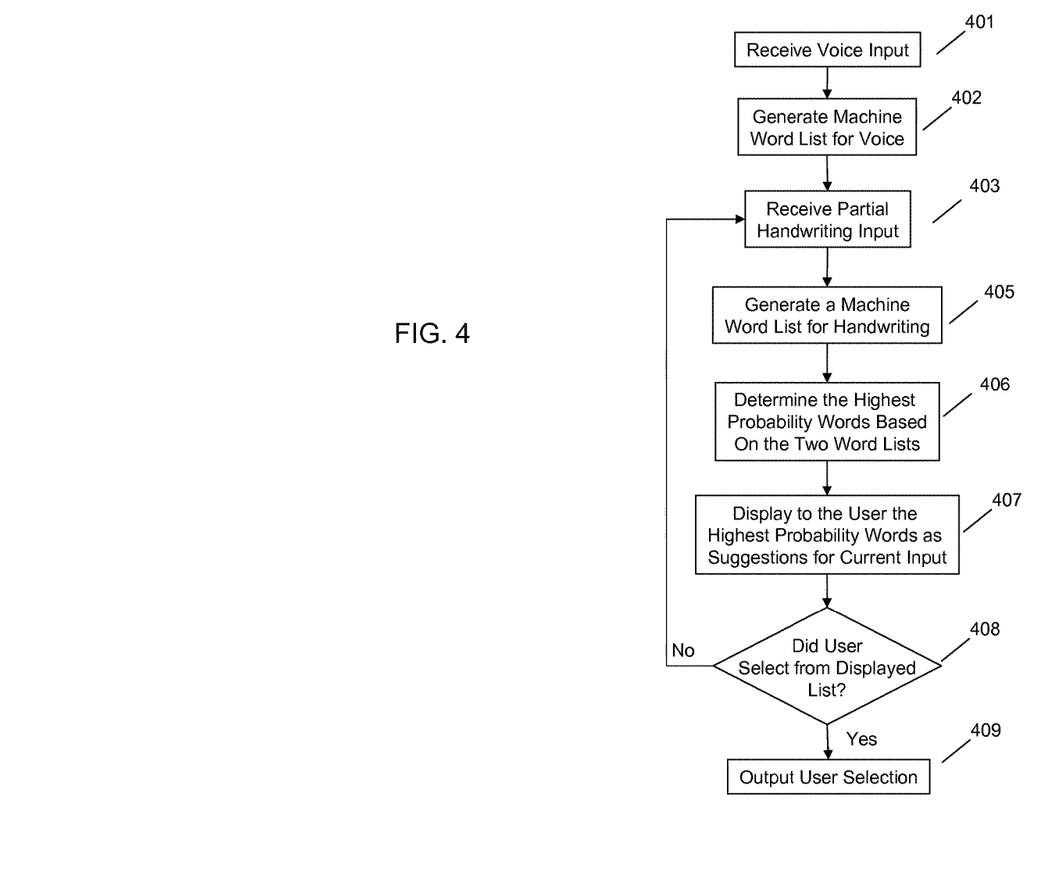
FIG. 4. illustrates an additional example method of improving handwriting recognition through voice recognition.

Referring now to FIG. 4, in an additional embodiment, because a user may finish speaking a term before then fully input it through handwriting, voice input may be received 401 prior to the user fully entering their handwriting input 403. The voice recognition software as above uses the voice input 401 to generate a machine input word list containing likely machine input word representations of the voice input 402. Although the user hasn't completely entered their handwriting input 403, a machine input word list is created based on their partial entry 405. Then, an embodiment, similar to above determines the highest probability words based on the two lists 406. Once a machine input word list has been created 402 and 405, and the combination has been analyzed 406, the user is presented with a list of possible selections for entry 407. By way of example, if a user is writing the world "alcohol" but has only entered the "a" and "l" they would likely be presented with at least the two top selections discussed above for the voice recognition: "alkaline" with 50% chance; "alcohol" with 40% chance. At this point, the user could select alcohol if it was presented 408 and the software would then output the selected term 409. However, the user could also choose not to make the selection and continue to further enter handwriting input 408. If the user continues to enter handwriting input, 403 a newly generated word list for the handwriting input 405 would be created. This would also cause the combined list of high probability words 407 to be altered and the display to the user would adjust accordingly 407 offering him new alternatives to select from.

Additionally or alternatively, an embodiment, could store the audio input as it is captured on a memory device (e.g., 240 of FIG. 2). By way of example, if a user were in a classroom setting, and wished to record the instructor as they took notes for later reference, the audio could be recorded and saved for future use in addition to being used to enhance the character recognition abilities during the handwriting input.

In an additional embodiment, the voice recording can be linked to the handwriting input for later reference. For example, the software could also make note suggestions for voice annotations and then tie the annotations to user's handwriting input. This would allow the user to later play back the annotations for further clarification if their handwritten notes aren't clear, or even include them within their notes based on the voice recognition software analysis.

Accordingly, as illustrated by the example embodiments and figures, an embodiment provides a method of receiving a user's handwriting input, while also receiving voice input. This received voice input is then, using voice recognition, used to create a machine input word list. Additionally, the user's handwriting input is also being transformed into recognized machine input words. Using the probability statistics, and possible other weighting factors, the character recognition of the handwriting input is augmented based on the machine input word list created by the analysis of the voice input. Through this process, the handwriting recognition is improved. The various embodiments described herein thus represent a technical improvement to handwriting recognition and user input methods.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an input and display device, handwriting input;
   receiving, using a processor, voice input, wherein the receiving voice input comprises receiving voice input at a time associated with receipt of the handwriting input;
   generating, using a processor, at least one first word based on the handwriting input and a probability associated with the at least one first word;
   generating, using a processor, at least one second word based on the voice input and a probability associated with the at least one second word, wherein the probability is based on a context of the voice input;
   determining, using a processor, a highest probability word based on the at least one first word and the at least one second word, wherein the determining comprises using at least one of: the at least one first word and the at least one second word to modify a probability of the other of: the at least one first word and the at least one second word; and
   providing the determined highest probability word.

2. The method of claim 1, further comprising:
   displaying, on the input and display device, at least one high probability word prior to the handwriting input being complete.

3. The method of claim 2, further comprising:
   receiving user input selecting one of the at least one high probability words.

4. The method of claim 1, wherein the voice input comprises receiving a verbal representation of the handwriting input being substantially concurrently input.

5. The method of claim 1, wherein the voice input comprises receiving a general discussion relating to the handwriting input being substantially concurrently input.

6. The method of claim 1, wherein the voice input comprises receiving a lecture relating to the handwriting input being substantially concurrently input.

7. The method of claim 1, further comprising:
   storing, on a memory device, a recording of the voice input.

8. The method of claim 7, wherein the highest probability word is linked to a retrievable time in the recording of the voice input.

9. The method of claim 1, wherein the generating a probability associated with the at least one first word comprises weighting, using the processor, each of the words from the at least one first word based on a handwriting recognition score; and
   wherein the generating a probability associated the at least one second word comprises weighting, using the processor, each of the words from the at least one second word based on a voice recognition score.

10. The method of claim 9, wherein the highest probability word is determined using a combination of the weighting of the at least one first word and the at least one second word.

11. An information handling device, comprising:
    an input device;
    a display device;
    an audio capture device;
    a processor;
    a memory device that stores instructions executable by the processor to:
    receive handwriting input;
    receive voice input, wherein to receive voice input comprises receiving voice input at a time associated with receipt of the handwriting input;
    generate at least one first word based on the handwriting input and a probability associated with the at least one first word;
    generate at least one second word based on the voice input and a probability associated with the at least one second word, wherein the probability is based on a context of the voice input;
    determine a highest probability word based on the at least one first word and the at least one second word, wherein to determines comprises using at least one of: the at least one first word and the at least one second word to modify a probability of the other of: the at least one first word and the at least one second word; and
    provide the determined highest probability word.

12. The information handling device of claim 11, further comprising:
   displaying, on the input and display device, at least one high probability words prior to the handwriting input being complete.

13. The information handling device of claim 11, wherein the Voice input comprises receiving a verbal representation of the handwriting input being substantially concurrently input.

14. The information handling device of claim 11, wherein the voice input comprises receiving a general discussion relating to the handwriting input being substantially concurrently input.

15. The information handling device of claim 11, wherein the voice input comprises receiving a lecture relating to the handwriting input being concurrently input.

16. The information handling device of claim 11, further comprising:
   storing, on the memory device, a recording of the voice input.

17. The information handling device of claim 16, wherein the highest probability word is linked to a retrievable time in the recording of the voice input.

18. The information handling device of claim 11, wherein the code that generates a probability associated with the at least one first word comprises code that weights, using the processor, each of the words from the at least one first word based on a handwriting recognition score; and
   wherein the code that generates a probability associated with the at least one second word comprises code that weights, using the processor, each of the words from the at least one second word based on a voice recognition score.

19. The information handling device of claim 18, wherein the highest probability word is determined using a combination of the weighting of the at least one first word and the at least one second word.

20. A product, comprising:
   a storage device having code stored therewith, the code being executable by a processor and comprising:
   code that receives, at an input and display device, handwriting input;
   code that receives voice input, wherein the code that receives voice input comprise code that receives voice input at a time associated with receipt of the handwriting input;
   code that generates at least one first word based on the handwriting input and a probability associated with the at least one first word;
   code that generates at least one second word based on the voice input and a probability associated with the at least one second word, wherein the probability is based on a context of the voice input;
   code that determines a highest probability word based on the at least one first word and the at least one second word, wherein the code that determines comprises code that uses at least one of: the at least one first word and the at least one second word to modify a probability of the other of: the at least one first word and the at least one second word; and
   code that provides the determined highest probability word.

* * * * *